United States Patent
Bauer et al.

(10) Patent No.: US 7,259,200 B2
(45) Date of Patent: Aug. 21, 2007

(54) PHOSPHORUS-CONTAINING FLAME RETARDANT AGGLOMERATES

(75) Inventors: Harald Bauer, Kerpen (DE); Sebastian Hoerold, Diedorf (DE); Werner Krause, Huerth (DE); Martin Sicken, Cologne (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 485 days.

(21) Appl. No.: 10/959,515

(22) Filed: Oct. 6, 2004

(65) Prior Publication Data

US 2005/0143503 A1 Jun. 30, 2005

(30) Foreign Application Priority Data

Oct. 7, 2003 (DE) ................. 103 47 012

(51) Int. Cl.
C08K 5/5313 (2006.01)

(52) U.S. Cl. .................. 524/126; 524/133; 252/609

(58) Field of Classification Search ............... 524/126, 524/133; 252/609
See application file for complete search history.

(56) References Cited

U.S. PATENT DOCUMENTS

| | | | | |
|---|---|---|---|---|
| 5,773,556 | A * | 6/1998 | Kleiner et al. | 528/321 |
| 5,780,534 | A * | 7/1998 | Kleiner et al. | 524/133 |
| 5,879,920 | A | 3/1999 | Dale et al. | |
| 5,958,287 | A | 9/1999 | Pullen | |
| 5,985,960 | A | 11/1999 | de Keijzer et al. | |
| 5,998,503 | A | 12/1999 | Jacobson et al. | |
| 6,015,510 | A | 1/2000 | Jacobson et al. | |
| 6,025,419 | A | 2/2000 | Kasowski et al. | |
| 6,051,708 | A | 4/2000 | de Keijzer et al. | |
| 6,084,012 | A | 7/2000 | Gareiss et al. | |
| 6,124,366 | A | 9/2000 | Pullen et al. | |
| 6,255,371 | B1 | 7/2001 | Schlosser et al. | |
| 6,365,071 | B1 | 4/2002 | Jenewein et al. | |
| 6,716,899 | B1 | 4/2004 | Klatt et al. | |
| 7,148,276 | B2 * | 12/2006 | Bauer et al. | 524/126 |
| 2004/0176510 | A1 | 9/2004 | Geprags | |
| 2004/0227130 | A1 | 11/2004 | Hoerold et al. | |
| 2005/0032958 | A1 | 2/2005 | Bauer et al. | |
| 2005/0101707 | A1 | 5/2005 | Bauer et al. | |
| 2005/0101706 | A1 | 5/2006 | Bauer et al. | |

FOREIGN PATENT DOCUMENTS

| | | |
|---|---|---|
| EP | 0487974 | 6/1992 |
| EP | 0990652 | 4/2000 |
| EP | 1396522 | 3/2004 |
| EP | 1396523 | 3/2004 |
| WO | WO96/16948 | 6/1996 |
| WO | WO98/08898 | 3/1998 |
| WO | WO98/45364 | 10/1998 |
| WO | WO 03/035736 | 5/2003 |

OTHER PUBLICATIONS

EPO Search Report for Corresponding application EP 04 02 3472, mailed Feb. 16, 2005.
U.S. Appl. No. 11/388,329, by Bauer et al., filed Mar. 24, 2006.
U.S. Appl. No. 11/388,916; by Bauer et al., filed Mar. 24, 2006.
U.S. Appl. No. 11/182,693, by Bauer et al. filed Jul. 15, 2005.
U.S. Appl. No. 11/093,599, by Bauer et al., filed Mar. 30, 2005.
U.S. Appl. No. 11/143,059, filed Jun. 2, 2005, by Bauer et al.

* cited by examiner

Primary Examiner—Peter Szekely
(74) Attorney, Agent, or Firm—Anthony A. Bisulca

(57) ABSTRACT

The invention relates to phosphorus-containing flame retardant agglomerates comprising
a) from 99.99 to 80% by weight of aggregates and/or primary particles composed of a phosphinic salt of the formula (I) and/or composed of a diphosphinic salt of the formula (II), and/or composed of polymers of these,

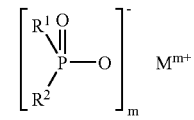

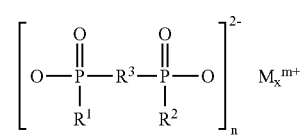

where
$R^1, R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Fe, Zr, Ce, Bi, Sr, Mn, Li, Na, K and/or a protonated nitrogen base;
m is from 1 to 4; n is from 1 to 4; x is from 1 to 4 and
b) from 0.01 to 20% by weight of auxiliaries.

The invention likewise relates to a process for the production of these phosphorus-containing flame retardant agglomerates, and also to polymeric compositions and moldings which comprise these phosphorus-containing flame retardant agglomerates.

38 Claims, No Drawings

PHOSPHORUS-CONTAINING FLAME RETARDANT AGGLOMERATES

The present invention is described in the German priority application No. 10347012.3, filed Jul. 10, 2003, which is hereby incorporated by reference as is fully disclosed herein.

The invention relates to phosphorus-containing flame retardant agglomerates of low bulk density in which aggregates and/or primary particles composed of phosphinic salts and/or composed of diphosphinic salts, and/or composed of polymers of these are present, the adhesion of the agglomerates being achieved with the aid of an auxiliary. The invention also relates to a process for the production of these phosphorus-containing flame retardant agglomerates, and to the use of the same as flame retardants in polymers.

It is essential that flame retardants have maximum homogeneity of distribution in a polymer. A particular factor which achieves good distribution is good flow behavior of the phosphorus-containing bulk material, this behavior being termed "free-flowing" hereinafter. This can be connected to the break-up of the phosphorus-containing flame retardant agglomerates to give smaller particles during addition to the polymer, this being hereinafter termed dispersion.

Powders composed of phosphorus-containing flame retardants with small particle sizes (below 500 μm) feature low bulk densities (below 300 g/l). However, a disadvantage is their marked tendency toward dusting. Another disadvantage is that the feed can be non-uniform during incorporation into polymers in extruders, a possible result of this being inhomogeneous distribution of the flame retardant in the polymer. In turn, this can be disadvantageous for flame retardancy, if the amount of feed is locally below specification.

According to the teaching of DE-A 102 41 376, phosphorus-containing flame retardants can be granulated via compaction. This achieves a relatively high bulk density, which is undesirable here according to the invention.

According to the teaching of DE-A 102 41 375, phosphorus-containing flame retardants can also be agglomerated via melt granulation. This likewise achieves a relatively high bulk density, again undesirable according to the invention. In addition, a relatively high content of waxes or of other auxiliaries is needed, and it is known that these have, for example, an adverse effect on the laser-inscribability of the plastic moldings.

WO 03/035736 discloses an agglomerate based on melamine cyanurate.

It is an object of the present invention to provide phosphorus-containing flame retardants in the form of low-bulk-density particles which can be incorporated into the polymer in a particularly simple manner, and in particular do not give the abovementioned "local accummulations" of flame retardant during incorporation into the polymer.

This object is achieved via an agglomerate of a phosphorus-containing flame retardant with low bulk density and nevertheless little tendency toward dusting.

The invention therefore provides phosphorus-containing flame retardant agglomerates, comprising a) from 99.99 to 80% by weight of aggregates and/or primary particles composed of a phosphinic salt of the formula (I) and/or composed of a diphosphinic salt of the formula (II), and/or composed of polymers of these,

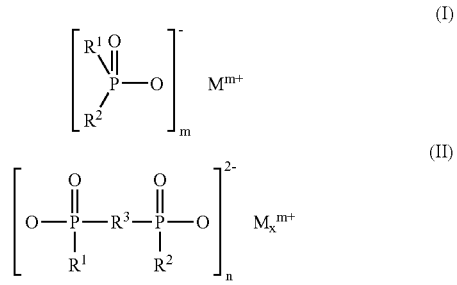

where
$R^1, R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Fe, Zr, Ce, Bi, Sr, Mn, Li, Na, K and/or a protonated nitrogen base;
m is from 1 to 4; n is from 1 to 4; x is from 1 to 4 and
b) from 0.01 to 20% by weight of auxiliaries which comprise polymers or copolymers based on vinylpyrrolidone, vinyl acetate, or vinylcaprolactam, or a mixture thereof, and/or comprise polymers or copolymers based on epoxides, urethanes, acrylates, esters, amides, stearates, olefins, cellulose derivatives, or a mixture thereof.

According to the invention, the term phosphorus-containing flame retardant agglomerates means particles of a phosphorus-containing flame retardant composition which comprises primary particles and/or aggregates composed of a phosphinic salt of the formula (I) and/or composed of a diphosphinic salt of the formula (II), and/or composed of polymers of these, where the particles of the composition have been bonded to one another via an auxiliary.

The phosphorus-containing flame retardant agglomerates preferably comprise a) from 99.9 to 85% by weight of aggregates and/or primary particles composed of a phosphinic salt of the formula (I), and/or of a diphosphinic salt of the formula (II), and/or composed of polymers of these, and b) from 0.1 to 15% by weight of auxiliary.

The phosphorus-containing flame retardant agglomerates particularly preferably comprise a) from 99.8 to 95% by weight of aggregates and/or primary particles composed of a phosphinic salt of the formula (I), and/or of a diphosphinic salt of the formula (II), and/or composed of polymers of these, and b) from 0.2 to 5% by weight of auxiliary.

The invention also provides phosphorus-containing flame retardant agglomerates which comprise a) from 99.9 to 80% by weight of aggregates and/or primary particles composed of a phosphinic salt of the formula (I), and/or of a diphosphinic salt of the formula (II), and/or composed of polymers of these, and composed of at least one synergist, and b) from 0.01 to 20% by weight of auxiliary.

The phosphorus-containing flame retardant agglomerates preferably comprise a) from 99.9 to 85% by weight of aggregates and/or primary particles composed of a phosphinic salt of the formula (I), and/or of a diphosphinic salt of the formula (II), and/or composed of polymers of these, and composed of at least one synergist, and b) from 0.1 to 15% by weight of auxiliary.

The phosphorus-containing flame retardant agglomerates particularly preferably comprise
a) from 99.8 to 95% by weight of aggregates and/or primary particles composed of a phosphinic salt of the formula (I), and/or of a diphosphinic salt of the formula (II), and/or composed of polymers of these, and composed of at least one synergist, and
b) from 0.2 to 5% by weight of auxiliary.

According to the invention, the term phosphorus-containing flame retardant agglomerates therefore also includes particles of a phosphorus-containing flame retardant composition which comprises primary particles and/or aggregates/primary particles composed of a phosphinic salt of the formula (I) and/or composed of a diphosphinic salt of the formula (II), and/or composed of polymers of these, and composed of at least one synergist, where the particles of the composition have been bonded to one another via an auxiliary.

Component a) preferably comprises from 30 to 99.9% by weight of phosphinic salt of the formula (I), and/or diphosphinic salt of the formula (II), and/or polymers of these, and from 0.1 to 70% by weight of at least one synergist.

Component a) preferably comprises from 50 to 99% by weight of phosphinic salt of the formula (I), and/or diphosphinic salt of the formula (II), and/or polymers of these, and from 1 to 50% by weight of at least one synergist.

In one preferred embodiment, component a) comprises
from 50 to 99% by weight of a zinc and/or aluminum and/or titanium and/or zirconium and/or iron salt of phosphinic acid of the formula (I), and/or of diphosphinic acid of the formula (II), and/or polymers of these, and
from 1 to 50% by weight of at least one synergist from the group of the salts of phosphoric acid and their condensates and/or of the salts of cyanuric acid with melamine and its condensates and/or hydrolysis products.

In another embodiment, component a) comprises
from 50 to 98% by weight of a zinc and/or aluminum and/or titanium and/or zirconium and/or iron salt of phosphinic acid of the formula (I), and/or of diphosphinic acid of the formula (II), and/or polymers of these, and
from 1 to 50% by weight of at least one synergist from the group of the salts of phosphoric acid and their condensates and/or of the salts of cyanuric acid with melamine and its condensates and/or hydrolysis products, and from 1 to 50% by weight of at least one synergist from the group of the zinc compounds.

M in the formulae (I) and (II) is preferably calcium, aluminum, or titanium.

Protonated nitrogen bases are preferably the protonated bases of ammonia, melamine, triethanolamine, and in particular $NH_4^+$.

$R^1$ and $R^2$, identical or different, are preferably $C_1$-$C_6$-alkyl, linear or branched, and/or phenyl.

$R^1$ and $R^2$, identical or different, are particularly preferably methyl, ethyl, n-propyl, isopropyl, n-butyl, tert-butyl, n-pentyl and/or phenyl.

$R^3$ is preferably methylene, ethylene, n-propylene, isopropylene, n-butylene, tert-butylene, n-pentylene, n-octylene, or n-dodecylene; phenylene or naphthylene; methylphenylene, ethylphenylene, tert-butylphenylene, methylnaphthylene, ethynaphthylene, or tert-butylnaphthylene; phenylmethylene, phenylethylene, phenylpropylene, or phenylbutylene.

The synergist preferably comprises a synergist which comprises a compound of nitrogen, of phosphorus, or of phosphorus and nitrogen.

This synergist preferably comprises melamine phosphate, dimelamine phosphate, melamine pyrophosphate, melamine polyphosphates, melam polyphosphates, melem polyphosphates, and/or melon polyphosphates, and/or comprises melamine condensates, such as melam, melem, and/or melon.

Compounds of this type and their preparation are described, inter alia, in WO 96/16948, WO 98/39306, WO 98/45364, and WO 98/08898, examples being melam polyphosphate (PMP-200®) or melem polyphosphate (PMP-300®), both from Nissan Chemical Industries.

According to the invention, other preferred synergists are nitrogen compounds of the formulae (III) to (VIII), or a mixture thereof

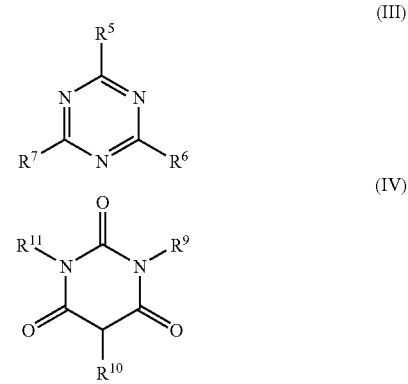

(III)

(IV)

(V)

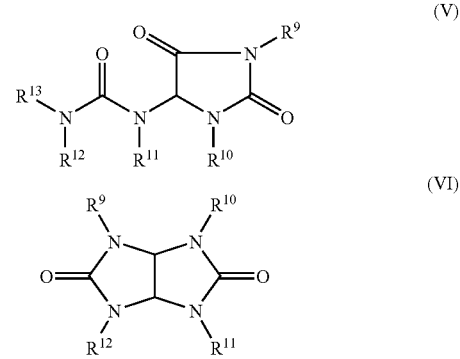

(VI)

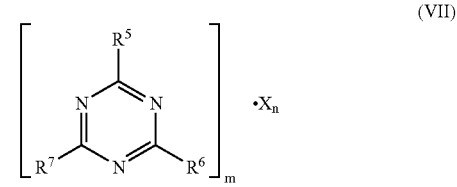

(VII)

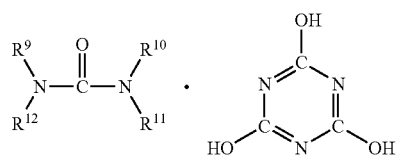

(VIII)

where
$R^5$ to $R^7$ are hydrogen, $C_1$-$C_8$-alkyl, $C_5$-$C_{16}$-cycloalkyl or -alkylcycloalkyl, where appropriate substituted with a hydroxy function or with a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$, and —$N(R^8)R^9$, either N-alicyclic or N-aromatic, R⁸ is hydrogen, $C_1$-$C_8$-alkyl, $C_5$-$C_{16}$-cycloalkyl or -alkylcycloalkyl, where appropriate substituted with a hydroxy function or with a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl, $R^9$ to $R^{13}$ are groups identical with $R^8$ or else —O—$R^8$, m and n, independently of one another, are 1, 2, 3, or 4, and X is acids which can form adducts with triazine compounds (III).

Other preferred synergists comprise oligomeric esters of tris(hydroxyethyl)isocyanurate with aromatic polycarboxylic acids, or comprise benzoguanamine, tris(hydroxyethyl)isocyanurate, allantoin, glycoluril, melamine, melamine cyanurate, dicyandiamide, guanidine, and/or carbodiimides; and/or comprise nitrogen-containing phosphates of the formulae $(NH_4)_yH_{3-y}PO_4$ or $(NH_4PO_3)_z$, where y is from 1 to 3 and z is from 1 to 10.000.

Other preferred synergists are oxygen compounds of silicon, magnesium compounds, metal carbonates of metals of the second main group of the Periodic Table, red phosphorus, zinc compounds, aluminum compounds, antimony, or other compounds.

The oxygen compounds of silicon preferably comprise salts and esters of orthosilicic acid and condensates thereof, or comprise silicates, zeolites, and silicas, or comprise glass powder, glass-ceramic, or ceramic powder; and the magnesium compounds preferably comprise magnesium hydroxide, hydrotalcites, magnesium carbonates, or magnesium calcium carbonates; and the aluminum compounds preferably comprise aluminum hydroxide or aluminum phosphate.

Preferred magnesium compounds are magnesium oxide, magnesium hydroxide (e.g. Magnifin H5 from Albermarle), magnesium oxide hydroxides, hydrotalcite, dihydrotalcite, magnesium carbonates, magnesium hydroxide carbonates, or magnesium calcium carbonates.

Calcium compounds are also suitable, e.g. calcium hydroxide, calcium oxide, hydrocalumite.

Other preferred compounds present are zinc compounds, e.g. zinc oxide (e.g. active zinc oxide from Rhein Chemie, Brüggemann KG, zincite, or calamine; standard zinc oxide, G6 zinc white, 2011 zinc oxide, F-80 zinc oxide, Pharma 8 zinc white, Pharma A zinc white, Rotsiegel zinc white, Weissiegel zinc white from Grillo-Werke AG), zinc hydroxide, zinc oxide hydrate.

Preference is given to zinc salts of the oxo acids of the fourth main group (anhydrous zinc carbonate, basic zinc carbonate, zinc hydroxide carbonate, basic zinc carbonate hydrate, (basic) zinc silicate, zinc hexafluorosilicate, zinc hexafluorosilicate hexahydrate, zinc stannate, zinc magnesium aluminum hydroxide carbonate).

Preference is given to elemental, metallic zinc.

Preference is given to zinc salts of the oxo acids of the third main group (zinc borate, e.g. Firebrake ZB, Firebrake 415 from Borax).

Preference is given to zinc salts of the oxo acids of the fifth main group (zinc phosphate, zinc pyrophosphate).

Preference is given to zinc salts of the oxo acids of the transition metals (zinc chromate(VI) hydroxide (zinc yellow), zinc chromite, zinc molybdate, e.g. ®Kemgard 911 B, zinc permanganate, zinc molybdate magnesium silicate, e.g. Kemgard 911 C from Sherwin-Williams Company).

Other preferred zinc salts are those having organic anions, e.g. zinc salts of mono-, di-, oligo-, or polycarboxylic acids (salts of formic acid (zinc formates), of acetic acid (zinc acetates, zinc acetate dihydrate, Galzin), of trifluoroacetic acid (zinc trifluoroacetate hydrate), zinc propionate, zinc butyrate, zinc valerate, zinc caprylate, zinc oleate, zinc stearate (Liga 101 from Greven Fett-Chemie), of oxalic acid (zinc oxalate), of tartaric acid (zinc tartrate), of citric acid (tribasic zinc citrate dihydrate), of benzoic acid (benzoate), zinc salicylate, of lactic acid (zinc lactate, zinc lactate trihydrate), of acrylic acid, of maleic acid, of succinic acid, of amino acids (glycine), of acidic hydroxy functions (zinc phenolate, etc.), zinc para-phenolsulfonate, zinc para-phenolsulfonate hydrate, zinc acetylacetonate hydrate, zinc tannate, zinc dimethyldithiocarbamate, zinc trifluoromethanesulfonate.

Preference is given to zinc phosphides, zinc sulfides, zinc selenides, and zinc tellurides.

Other preferred compounds are aluminum compounds, e.g. aluminum oxide, aluminum oxide hydroxide (boehmite, diaspore), aluminum hydroxide (bayerite, gibbsite, hydrargillite), or aluminum phosphate.

Other preferred compounds are tin compounds, e.g. tin oxide, tin oxide hydrates, stannous hydroxide, tin sulfide.

Preference is given to antimony compounds, such as antimony trioxide (Bluestar® RG from Campine, Belgium; antimony tetroxide, antimony pentoxide, sodium antimonate (Pyrobloc® SAP-2 from Cookson Specialty Additives), and/or antimony tartrate.

Other preferred synergists are carbodiimides (e.g. ®Stabaxol 1, Stabaxol P, Stabaxol KE 9193 from Rhein Chemie), N,N'-dicyclohexylcarbodiimide, and/or polyisocyanates (e.g. ®Basonat HI 100 or ®Vestanat T 1890/100), carbonylbiscaprolactam (Allinco), or styrene-acrylic polymers (®Joncryl ADR-4357 from Johnson); sterically hindered phenols (e.g. Hostanox OSP 1), sterically hindered amines and light stabilizers (e.g. Chimasorb 944, Hostavin grades), phosphonites and antioxidants (e.g. Sandostab® P-EPQ from Clariant), and release agents (®Licomont grades from Clariant).

The melting or softening point of the auxiliary is preferably from 40 to 350° C., preferably from 60 to 300° C.

According to the invention, the auxiliary comprises polymers or copolymers based on vinylpyrrolidone, vinyl acetate, and vinylcaprolactam, or a mixture thereof, and/or comprises polymers or copolymers based on epoxides, on urethanes, on acrylates, on esters, on amides, on stearates, on olefins, on cellulose derivatives, or on a mixture thereof.

Preference is given to the use of an auxiliary comprising a polyvinylpyrrolidone with a molecular weight of from 45 000 to 2 000 000, preferably from 45 000 to 55 000, or with a molecular weight of from 7 000 to 11 000, or from 1 200 000 to 2 000 000.

Other preferred auxiliaries are polyvinyl alcohol, polyvinyl butyral (PVB), polyvinylcaprolactam, hydroxyethylcellulose, hydroxypropylcellulose, and/or sodium carboxymethylcellulose.

Another preferred auxiliary is a partially hydrolyzed polyvinyl alcohol whose degree of hydrolysis is from 85 to 95 mol %, and whose ester value is from 80 to 220 mg KOH/g and whose viscosity is from 2.5 to 49 mPa·s at 20° C. in 4% by weight aqueous dispersion.

Another preferred auxiliary is a partially hydrolyzed polyvinyl alcohol whose degree of hydrolysis is from 97 to 100 mol %, and whose ester value is from 3 to 40 mg KOH/g and whose viscosity is from 2.8 to 60 mPa·s at 20° C. in 4% by weight aqueous dispersion.

The median particle size of the inventive phosphorus-containing flame retardant agglomerate is preferably from 0.1 to 3000 μm, with preference from 100 to 3000 μm, and particularly preferably from 200 to 2000 μm.

The bulk density of the phosphorus-containing flame retardant agglomerates is preferably from 80 to 1500 g/l, with preference from 80 to 800 g/l, particularly preferably from 200 to 500 g/l, and very particularly preferably from 200 to 400 g/l.

The median particle diameter of the phosphinate aggregates or synergist aggregates used is preferably from 0.1 to 500 μm, with preference from 1 to 100 μm.

The median particle diameter of the phosphinate primary particles or synergist primary particles used is preferably from 0.1 to 50 μm, with preference from 1 to 10 μm.

The invention also provides a process for preparing phosphorus-containing flame retardant agglomerates, which comprises agglomerating aggregates and/or primary particles composed of a phosphinic salt of the formula (I) and/or composed of a diphosphinic salt of the formula (II), and/or composed of polymers of these, and, where appropriate, composed of at least one synergist, in the presence of an auxiliary in a mixer, or a fluidized bed, or via spray drying.

The design of the process is preferably such that aggregates and/or primary particles composed of a phosphinic salt of the formula (I), and/or composed of a diphosphinic salt of the formula (II), and/or composed of polymers of these, and, where appropriate, composed of at least one synergist, and also of the auxiliary, are dispersed in a solvent, fed to the fluidized bed, dried, and granulated, the agglomerates then being isolated, and the product having the specified grain size separated.

The design of the process is preferably such that aggregates and/or primary particles composed of a phosphinic salt of the formula (I), and/or composed of a diphosphinic salt of the formula (II), and/or composed of polymers of these, and, where appropriate, composed of at least one synergist, are fed, together with the auxiliary, to the fluidized bed, and a solvent is metered in, the material then being granulated, and the agglomerates then being isolated, and the product having the specified grain size separated.

The product having greater-than-specified or smaller-than-specified grain size is preferably returned.

The solvent preferably comprises water, alcohols, glycols, aromatics, aliphatics, cycloaliphatics, ethers, glycol ethers, ketones, esters, chlorinated hydrocarbons and aromatics, or a mixture thereof.

The agglomeration takes place in one or more stages at a pressure of from 10 to 100 000 000 Pa, for a period of from 0.01 to 1000 h, and at a temperature of from −20 to +500° C., preferably from 50 to 350° C.

The temperature of gas inlet to the fluidized bed is preferably from 50 to 320° C., particularly preferably from 60 to 250° C., and the exit temperature is preferably from 25 to 180° C.

The invention also provides a flame-retardant polymer molding composition which comprises the inventive phosphorus-containing flame retardant agglomerates.

The flame-retardant polymer molding composition preferably comprises
from 1 to 50% by weight of phosphorus-containing flame retardant agglomerates,
from 1 to 99% by weight of thermoplastic polymer, or a mixture of the same,
from 0 to 60% by weight of additives,
from 0 to 60% by weight of filler.

The flame-retardant polymer molding composition particularly preferably comprises
from 5 to 30% by weight of phosphorus-containing flame retardant agglomerates,
from 5 to 90% by weight of thermoplastic polymer, or a mixture of the same,
from 5 to 40% by weight of additives,
from 5 to 40% by weight of filler.

The thermoplastic polymer preferably comprises HI (high-impact) polystyrene, polyphenylene ether, polyamides, polyesters, polycarbonates, and blends or polyblends of the type represented by ABS (acrylonitrile-butadiene-styrene) or PC/ABS (polycarbonate/acrylonitrile-butadiene-styrene).

The thermoplastic polymers particularly preferably comprise polyamide, polyester, or ABS.

The invention also provides polymeric moldings, films, filaments, and fibers which comprise the inventive phosphorus-containing flame retardant agglomerates.

The polymer preferably comprises a thermoplastic or thermoset polymer.

The thermoplastic polymers preferably comprise HI (high-impact) polystyrene, polyphenylene ether, polyamides, polyesters, polycarbonates, and blends or polyblends of the type represented by ABS (acrylonitrile-butadiene-styrene) or PC/ABS (polycarbonate/acrylonitrile-butadiene-styrene).

The thermoset polymers preferably comprise formaldehyde resin polymers, epoxy resin polymers, melamine resin polymers, phenolic resin polymers, and/or polyurethanes.

The polymeric moldings, films, filaments, and fibers preferably comprise
from 1 to 50% by weight of phosphorus-containing flame retardant agglomerates,
from 1 to 99% by weight of polymer, or a mixture of the same,
from 0 to 60% by weight of additives,
from 0 to 60% by weight of filler.

The polymeric moldings, films, filaments, and fibers particularly preferably comprise
from 5 to 30% by weight of phosphorus-containing flame retardant agglomerates,
from 5 to 90% by weight of polymer, or a mixture of the same,
from 5 to 40% by weight of additives,
from 5 to 40% by weight of filler.

Finally, the invention also provides a flame-retardant coating comprising
from 1 to 50% of phosphorus-containing flame retardant agglomerates,
from 0 to 60% of ammonium polyphosphate,
from 0 to 60% by weight of additives and auxiliaries.

Suitable synergists are melamine phosphate (e.g. Melapur MPH, ®Melapur MP from Ciba-DSM Melapur), melamine acetate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate (e.g. ®Budit 311 from Budenheim, ®MPP-B from Sanwa Chemicals), melamine polyphosphates, melam polyphosphates, melem polyphosphates, and/or melon polyphosphates. Particular preference is given to melamine polyphosphates, such as Melapur 200/70, Melapur CGX FR231 from Ciba-DSM Melapur, Budit 3141, 3141 CA, and 3141 CB, and melamine polyphosphate/melamine pyrophosphate of grades 13-1100, 13-1105, 13-1115, MPP02-244 from Hummel-Croton, and PMP-100(R) or PMP-200 from Nissan Chemical Industries, Japan. Likewise suitable are: Melapur MC 25, Melapur MC, or Melapur MC XL from Ciba-DSM Melapur, and melamine ammonium polyphosphates.

The selection of the auxiliary is such that when the agglomerate is incorporated into the polymer it breaks up to give separate aggregates and/or primary particles with a median particle size of from 0.1 to 500 μm.

The auxiliary bonds the aggregates and primary particles to one another, but not so strongly that they cannot redisperse again within a polymer. This means that different auxiliaries have to be selected, depending on the process and/or process conditions intended for incorporating the phosphorus-containing flame retardants into polymers. The melting point or softening point of the auxiliary is selected to be lower than the melting point of the polymer used and, respectively, lower than the processing temperature of the polymer. On the other hand, the melting point or softening point of the auxiliary must not be so low that it softens during the storage of the inventive flame retardant and leads to caking of the agglomerates.

The softening point of the auxiliary is preferably below that of the polymer by from 10 to 50° C.

If the agglomerates are prepared from an aqueous slurry, water-soluble organic auxiliary materials are advantageous, because they can simply be added to the slurry.

Examples of suitable polyvinylpyrrolidones are ®Luviskol, Luviskol K90, Luviskol K30, and Luviskol K17 (BASF, Germany). Preferred polyvinyl alcohols are ®Mowiol 8-88, Mowiol 40-88 from Kuraray.

Preferred process for the agglomeration is constructive agglomeration. Particular preference is given to agglomeration in mixers, in a fluidized bed, or during spray drying. Surprisingly, it has been found that an inventive flame retardant agglomerate is very readily available via spray granulation.

According to the invention, the term aggregate means particles which in turn are composed of an arrangement of primary particles.

In the case of agglomeration in mixers, the particles to be agglomerated are wetted with auxiliary and continuously combined and separated in high-performance mixers. Preferred high-performance mixers are those from Lödige, Eirich, etc. The auxiliary is applied via spraying or metering.

In the case of spray-bed granulation, the material to be agglomerated is subjected to flotation by a stirrer or by a stream of gas to give a fluidized bed. Further material to be agglomerated, which has been dispersed in a solvent, is sprayed (top-spray) into this fluidized bed. The moist particles deposit onto the existing agglomerates. The solvent is evaporated via a stream of hot gas, and thus the agglomerates are dried. Some of the fluidized bed is continuously discharged, the particles having the specified grain size are isolated, and coarse particles are comminuted and returned together with excessively fine particles into the fluidized bed.

Process air with temperatures within the range from about 50° C. up to the decomposition temperature of the individual components of the agglomerate to be produced is introduced from below into the fluidized bed. In the case of dispersions, drying and hardening of the granules formed via spraying is brought about by the energy introduced by way of the process air. The flow rate of the drying medium in the fluidized-bed apparatus is from 0.5 to 5 m/s. Product parameters such as grain size and grain moisture level are varied via adjustment of the process air parameters.

Nucleation within the fluidized bed takes place in particular at the start of the process without an initial charge of material via spray drying. During the process, nucleation results from internal nucleation within the process via dust and abrasion and/or external nucleation via return of sieve-excluded and comminuted particles which had greater-than-specified grain size. The particles entrained by the process air, in particular the fine dust, are separated from the air in a dust separator present in the fluidized-bed apparatus (depressurization region and cyclone separator or integrated filters within the depressurization region), and/or in external separator systems, and returned into the fluidized bed, for example as nuclei. Pulverulent components or additional components can also be introduced into the fluidized bed by way of a separate inlet apparatus, and these then participate in the granule-forming process. This gives inventive low-dust or dust-free granules.

The discharge of the final product material takes place by way of a rotary valve, a double gate, other tightly-closing discharge units, or by way of a classifying material discharge system downstream of which there is a tightly-closing discharge unit. In the case of a classifying material discharge system here, the open-type velocity of the classifying air is from 2 to 15 m/s, depending on the granule grain size, its direction being opposite to the discharge direction of the final product within the exhaust pipe.

Preferred apparatuses for laboratory operation are Strea-1 fluidized-bed equipment from Niro, and for production are Schugi Vometec systems from Hosokawa Schugi, spray granulation systems from Heinen and from Glatt (GF 20 with 15 kg/h water evaporation, GF 50 with 40 kg/h water evaporation, GF 125 with 100 kg/h water evaporation, GF 250 with 195 kg/h water evaporation, GF 500 with 385 kg/h water evaporation, GF 750 with 580 kg/h water evaporation, GF 1000 with 770 kg/h water evaporation).

The dispersion of the aggregates and/or primary particles composed of phosphinic salts and/or composed of diphosphinic salts, and/or composed of polymers of these, and, where appropriate, composed of synergists preferably comprises from 0.1 to 50% solids content.

In another granulation method, agglomerates and/or primary particles and the auxiliary in the form of powder are continuously mixed and are introduced into the fluidized bed. Granulation of the solid takes place via treatment of the powder with warm air in the region of the melting point of the auxiliary and via solution effects and crystallization effects.

In another granulation method, agglomerates and/or primary particles and the auxiliary in the form of powder are continuously mixed and introduced into the fluidized bed. Granulation of the solid takes place via treatment of the powder with solvent introduced by spraying.

In another embodiment, inventive phosphorus-containing flame retardant agglomerates are coated or, respectively, powdered with other plastics additives. Coating is preferred for hydrolysis stabilizers, and can be realized in the same system (top- and bottom-spray).

Powdering with solid, fine-grain, high-melting-point powders (talc or any other desired plastics additive) is preferred, in order to achieve release action between the agglomerates and inhibit their caking or conglutination, and thus achieve better storage stability.

In another preferred method, the aggregates and/or primary particles composed of phosphinic salts, and/or composed of diphosphinic salts, and/or composed of polymers of these, and, where appropriate, composed of synergists, are mixed in a mixer with moderate or high shear rate and then dried in a fluidized bed and agglomerated. Preference is given here to a combination of a Schugi mixer with a fluidized-bed dryer.

Preference is also given to spray drying in a procedure such that the dispersion is atomized together with dried spray powder at the top of the spray tower. This can achieve an agglomeration effect.

According to the invention, the aggregates and/or primary particles composed of a) phosphinic salts of the formula (I), and/or a diphosphinic salt of the formula (II), and/or polymers of these, and
b) synergists are dispersed in a solvent.

According to the invention, the auxiliary is dissolved or, respectively, dispersed in the same solvent.

It is also preferable that the aggregate and/or primary particles composed of phosphinic salts, and/or composed of diphosphinic salts, and/or composed of polymers of these are precipitated in the inventive solvent, and/or in the presence of the auxiliary, and/or in the presence of the synergists.

It is also preferred that the aggregates and/or primary particles of the synergists are precipitated in the inventive solvent, and/or in the presence of the auxiliary, and/or in the presence of the phosphinic salts, and/or diphosphinic salts, and/or polymers of these.

Other suitable solvents are acetone, acetonitrile, acetophenone (methyl phenyl ketone), methyl formate, isoamyl alcohol, (3-methyl-1-butanol), tert-amyl alcohol (2-methyl-2-butanol), n-amyl alcohol (1-pentanol), anisole (methyl phenyl ether), benzyl alcohol, n-butanol, isobutanol, tert-butanol, n-butyl chloride (1-chlorobutane), sec-butyl chloride (2-chlorobutane), tert-butyl chloride (2-chloro-2-methylpropane), butylene 1,2-glycol (1,2-butanediol), butylene 1,3-glycol (1,3-butanediol), butylene 1,4-glycol (1,4-butanediol, tetramethylene glycol), tert-butyl methyl ether, n-butyl vinyl ether, n-butyraldehyde, ethyl chloroacetate, 2-chlorotoluene, cyclohexane, cyclopentane, dibenzyl ether, 1,2-dichlorobenzene, 1,4-dichlorobenzene, dichloromethane, diethylene glycol, diethylene glycol diethyl ether, diethylene glycol dimethyl ether (diglyme), diethylene glycol monobutyl ether, diethylene glycol monomethyl ether, diethyl ether, diisopropyl ether, 1,2-dimethoxyethane (DME, monoglyme), dimethylformamide, 1,4-dioxane, diphenyl ether, methyl acetate, ethanol, ethyl acetate, ethylene glycol, ethylene glycol monobutyl ether, n-heptane, 1-hexadecanol(cetyl alcohol), n-hexane, 1-hexanol, iodocyclohexane, kerosene, mesitylene, methanol, methyl acrylate, methylcyclohexane, methyl ethyl ketone, methyl isobutyl ketone, methyl vinyl ether, 1-octanol, isooctanol (2-ethyl-1-hexanol), n-octanol, paraffin oil, high-boiling white petroleum spirit, petroleum ether, high-boiling petroleum ether, petroleum (172-215° C.), naphtha (140-180° C.), naphtha (60-80° C.), low-boiling naphtha, 1,2-propanediol, 1,3-propanediol, isopropanol (2-propanol), n-propanol, propylene glycol, tetraethylene glycol dimethyl ether, tetrahydrofuran, toluene, 1,1,1-trichloroethane, 1,1,2-trichloroethane, trichloroethylene, trichloromethane, 1,2,3-trichloropropane, isotridecanol, triethanolamine, triethylene glycol dimethyl ether (triglyme), triethylene glycol monomethyl ether, diisopropyl ether, m-xylene, o-xylene, p-xylene, or a mixture thereof.

The polymers preferably comprise polymers of mono- and diolefins, for example polypropylene, polyisobutylene, poly-1-butene, poly-4-methyl-1-pentene, polyisoprene, and polybutadiene, and also polymers of cycloolefins, e.g. of cyclopentene or norbornene; also polyethylene (which may, where appropriate, have been crosslinked), e.g. high-density polyethylene (HDPE), high-density high-molecular-weight polyethylene (HDPE-HMW), high-density ultra high-molecular-weight polyethylene (HDPE-UHMW), medium-density polyethylene (MDPE), low-density polyethylene (LDPE), linear low-density polyethylene (LLDPE), and branched low-density polyethylene (VLDPE) or a mixture thereof.

The polymers preferably comprise copolymers of of mono- and diolefins with one another or with other vinyl monomers, e.g. ethylene-propylene copolymers, linear low-density polyethylene (LLDPE), and mixtures of the same with low-density polyethylene (LDPE), propylene-1-butene copolymers, propylene-isobutylene copolymers, ethylene-1-butene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers of these with carbon monoxide, and ethylene-acrylic acid copolymers and salts of these (ionomers), and also terpolymers of ethylene with propylene and with a diene, such as hexadiene, dicyclopentadiene, or ethylidenenorbornene; also mixtures of these copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, and alternating-structure or random-structure polyalkylene-carbon monoxide copolymers, and mixtures of these with other polymers, e.g. with polyamides.

The polymers preferably comprise hydrocarbon resins (e.g. $C_5$-$C_9$), inclusive of hydrogenated modifications thereof (e.g. tackifier resins), and mixtures of polyalkylenes and starches.

The polymers preferably comprise polystyrene, poly(p-methylstyrene), poly(alpha-methylstyrene).

The polymers preferably comprise copolymers of styrene or alpha-methylstyrene with dienes or with acrylic derivatives, e.g. styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures with high impact strength made from styrene copolymers with another polymer, e.g. with a polyacrylate, with a diene polymer, or with an ethylene-propylene-diene terpolymer; and block copolymers of styrene, e.g. styrene-butadiene-styrene, styrene-isoprene-styrene, styrene-ethylene/butylene-styrene, and styrene-ethylene/propylene-styrene.

The polymers preferably comprise graft copolymers of styrene or alpha-methylstyrene, e.g. styrene on polybutadiene, styrene on polybutadiene-styrene copolymers, styrene on polybutadiene-acrylonitrile copolymers, styrene and acrylonitrile (and, respectively, methacrylonitrile) on polybutadiene; styrene, acrylonitrile, and methyl methacrylate on polybutadiene; styrene and maleic anhydride on polybutadiene; styrene, acrylonitrile, and maleic anhydride or maleimide on polybutadiene; styrene and maleimide on polybutadiene, styrene and alkyl acrylates and, respectively, alkyl methacrylates on polybutadiene, styrene and acrylonitrile on ethylene-propylene-diene terpolymers, styrene and acrylonitrile on polyalkyl acrylates or on polyalkyl methacrylates, styrene and acrylonitrile on acrylate-butadiene copolymers, and also mixtures of these, e.g. those known as ABS polymers, MBS polymers, ASA polymers, or AES polymers.

The polymers preferably comprise halogen-containing polymers, e.g. polychloroprene, chlorinated rubber, chlorinated and brominated isobutylene-isoprene copolymer (halobutyl rubber), chlorinated or chlorosulfonated polyethylene, copolymers of ethylene with chlorinated ethylene, epichlorohydrin homo- and copolymers, and in particular polymers of halogen-containing vinyl compounds, e.g. polyvinyl chloride, polyvinylidene chloride, polyvinyl fluoride, polyvinylidene fluoride; and copolymers of these, such as vinyl chloride-vinylidene chloride, vinyl chloride-vinyl acetate, and vinylidene chloride-vinyl acetate.

The polymers preferably comprise polymers derived from alpha, beta-unsaturated acids or some derivatives of these, for example polyacrylates and polymethacrylates, butyl-acrylate-impact-modified polymethyl methacrylates, polyacrylamides, and polyacrylonitriles, and copolymers of the monomers mentioned with one another or with other unsaturated monomers, e.g. acrylonitrile butadiene copolymers, acrylonitrile-alkyl acrylate copolymers, acrylonitrile-alkoxyalkyl acrylate copolymers, acrylonitrile-vinyl halide copolymers, and acrylonitrile-alkyl methacrylate-butadiene terpolymers.

The polymers preferably comprise polymers derived from unsaturated alcohols or amines and, respectively, their acyl derivatives or acetals, for example polyvinyl alcohol, polyvinyl acetate, polyvinyl stearat, polyvinyl benzoate, polyvinyl maleate, polyvinyl butyral, polyallyl phthalate, polyallylmelamine; or copolymers of these with olefins.

The polymers preferably comprise homo- or copolymers of cyclic ethers, e.g. polyalkylene glycols, polyethylene oxide, polypropylene oxide, or copolymers of these with bisgiycidyl ethers.

These polymers preferably comprise polyacetals, such as polyoxymethylene, and polyoxymethylenes which contain comonomers, e.g. ethylene oxide; polyacetals modified with thermoplastic polyurethanes, with acrylates, or with MBS.

The polymers preferably comprise polyphenylene oxides or polyphenylene sulfides, or a mixture of these with styrene polymers or with polyamides.

The polymers preferably comprise polyurethanes derived, on the one hand, from polyethers, polyesters, or polybutadienes having terminal hydroxy groups, and, on the other hand, from aliphatic or aromatic polyisocyanates, or else precursors of these polyurethanes.

The polymers preferably comprise polyamides and copolyamides derived from diamines and dicarboxylic acids, and/or from aminocarboxylic acids, or from the corresponding lactams, for example nylon-4, nylon-6 (Akulon K122, DSM; Zytel 7301, DuPont; Durethan B 29, Bayer), nylon-6,6 (Zytel 101, DuPont; Durethan A30, Durethan AKV, Durethan AM, Bayer; Ultramid A3, BASF), -6,10, -6,9, -6,12, -4,6, -12,12, nylon-11, and nylon-12 (Grillamid L20, Ems Chemie), aromatic polyamides based on m-xylene, diamine and adipic acid; polyamides prepared from hexamethylenediamine and iso- and/or terephthalic acid and, where appropriate, an elastomer as modifier, e.g. poly-2,4,4-trimethylhexamethyleneterephthalamide or poly-m-phenyleneisophthalamide. Other suitable polymers are block copolymers of the abovementioned polyamides with polyolefins, with olefin copolymers, with ionomers, or with chemically bonded or grafted elastomers; or with polyethers, e.g. with polyethylene glycol, polypropylene glycol, or polytetramethylene glycol. EPDM- or ABS-modified polyamides or copolyamides are also suitable, as are polyamides condensed during processing ("RIM polyamide systems").

The polymers preferably comprise polyureas, polyimides, polyamideimides, polyetherimides, polyesterimides, polyhydantoins, or polybenzimidazoles.

The polymers preferably comprise polyesters which derive from dicarboxylic acids and dialcohols and/or from hydroxycarboxylic acids, or from the corresponding lactones, for example polyethylene terephthalate, polybutylene terephthalate (Celanex 2500, Celanex 2002, Celanese; Ultradur, BASF), poly-1,4-dimethylolcyclohexane terephthalate, polyhydroxybenzoates, and also block polyetheresters which derive from polyethers having hydroxyl end groups; said polyesters modified with polycarbonates or with MBS.

The polymers preferably comprise polycarbonates or polyester carbonates, or else polysulfones, polyether sulfones, or polyether ketones.

The polymers preferably comprise crosslinked polymers derived from aldehydes on the one hand and from phenols, urea, or melamine on the other hand, for example phenol-formaldehyde resins, urea-formaldehyde resins, or melamine-formaldehyde resins; drying and non-drying alkyd resins are also suitable.

The polymers preferably comprise unsaturated polyester resins derived from copolyesters of saturated or unsaturated dicarboxylic acids with polyhydric alcohols, and also vinyl compounds as crosslinking agents, or else halogen-containing, flame-retardant modifications of these.

The polymers preferably comprise crosslinkable acrylic resins derived from substituted acrylic esters, e.g. from epoxyacrylates, from urethane acrylates, or from polyester acrylates.

The polymers preferably comprise alkyd resins, polyester resins, or acrylate resins which have been crosslinked by melamine resins, by urea resins, by isocyanates, by isocyanurates, by polyisocyanates, or by epoxy resins.

The polymers preferably comprise crosslinked epoxy resins which derive from aliphatic, cycloaliphatic, heterocyclic, or aromatic glycidyl compounds, e.g. products of bisphenol A diglycidyl ethers or of bisphenol F diglycidyl ethers, which are crosslinked by way of conventional hardeners, e.g. anhydrides or amines, with or without accelerators.

The polymers preferably comprise mixtures (polyblends) of the abovementioned polymers, e.g. PP/EPDM, nylon/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylate, POM/MBS, PPO/HIPS, PPO/nylon-6,6 and copolymers, PA/HDPE, PA/PP, PA/PPO, PBT/PC/ABS, and PBT/PET/PC.

The agglomerates feature improved flame retardancy, particularly a short afterflame time and less flaming drops, and excellent mechanical properties (tensile strength, tensile strain at break, tensile modulus of elasticity, impact strength, notched impact strength).

The inventive flame retardant composition is preferably used in compounded materials which are then used to produce polymer moldings.

The flame retardant compositions may be incorporated into thermoplastic polymers by, for example, premixing all of the constituents in the form of powder and/or granules in a mixer and then homogenizing them within the polymer melt in a compounding assembly (e.g. a twin-screw extruder). Twin-screw extruders are preferred (ZSK30, ZSK 40, ZSK 58 from Krupp Werner & Pfleiderer). The melt is usually drawn off in the form of a strand, cooled, and granulated. The components may also be introduced separately by way of a feed system, directly into the compounding assembly.

It is also possible to admix the flame retardant additives with finished polymer granules or finished polymer powder, and to process the mixture directly in an injection-molding machine to give moldings. Preferred fillers are formed of glass (preferably beads or fibers).

Preferred additives are antioxidants (e.g. alkylated monophenols, alkylthiomethylphenols, hydroquinones, and alkylated hydroquinones, hydroxylated thiodiphenyl ethers, alkylidenebisphenols, O—, N—, and S-benzyl compounds, hydroxybenzylated malonates, hydroxybenzyl aromatics, triazine compounds, benzyl phosphonates, acylaminophenols, esters of beta-(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl)propionic acid with mono- or polyhydric alcohols, esters of 3,5-di-tert-butyl-4-hydroxyphenylacetic acid with mono- or polyhydric alcohols, amides of beta-(3,5-di-tert-butyl-4-hydroxyphenyl)propionic acid, ascorbic acid (vitamin C), aminic antioxidants, UV absorbers, and light stabilizers, 2-(2'-hydroxyphenyl)benzotriazoles, 2-hydroxybenzophenones, esters of unsubstituted or substituted benzoic acids, acrylates; nickel complexes of 2,2'-thiobis[4-(1,1,3,3-tetramethylbutyl)phenol], nickel salts of monoalkyl esters of 4-hydroxy-3,5-di-tert-butylbenzylphosphonic acid, nickel complexes of ketoximes, nickel complexes of 1-phenyl-4-lauroyl-5-hydroxypyrazole, where appropriate with additional ligands; sterically hindered amines, oxalamides, 2-(2-hydroxyphenyl)-1,3,5-triazines, lubricants, colorants, nucleating agents, e.g. inorganic substances, e.g. talc, metal oxides, such as titanium dioxide or magnesium oxide, phosphates, carbonates, or sulfates of, preferably, alkaline earth metals; organic compounds, such as mono- or polycarboxylic acids, or else their salts, e.g. 4-tert-butylbenzoic acid, adipic acid, diphenylacetic acid, sodium succinate, or sodium benzoate; polymeric compounds, e.g. ionic copolymers ("ionomers"), fillers, and reinforcing agents (e.g. chalk and calcium carbonate, silicates, phyllosilicates, clay minerals, e.g. bentonite, montmorillonite, hectorite, saponite, precipitated/fumed/crystalline/amorphous silicas, glass fibers, glass beads, asbestos, talc, kaolin, mica, barium sulfate, metal oxides, and metal hydroxides, oxides and/or hydroxides of the elements of the second and third main group of the Periodic Table of the Elements (preferably aluminum and magnesium), carbon black, graphite, wood flour, and flours or fibers derived from other natural products, or synthetic fibers), or antistatic agents. EP-A-584 567 gives examples of the additives which can be used.

Determination of Tendency Toward Dusting 10 g of the material to be studied are weighed into a wash bottle. Nitrogen is passed through the material for 20 min, the gas flow rate being 1 l/min. The amount of powder remaining after this is weighed. The proportion discharged is divided by the initial weight and based on 100%.

Determination of Grain Size Distribution, Using the Microtrac Granulometer.

The median particle size (median grain size, $d_{50}$) in aqueous dispersion is determined with the aid of a Microtrac ASVR/FRA granulometer from Leeds and Northrup. The reflection or diffraction of a laser beam is measured on passage through the dispersion. For this, 400 ml of ethanol are pumped through the laser test cell. The solid specimen (e.g. 70 mg) is metered in automatically and the particle size distribution is determined after 10 min. The evaluation unit on the equipment calculates the $d_{50}$ value and the $d_{90}$ value.

Spray Granulation 12 kg/h of suspension are processed to give granules in a GF 20 pilot-plant-scale fluidized-bed system from Glatt with classifying granule discharge.

Fluidization of the fluidized bed is maintained using basal air heated to 110° C. The open-pipe velocity in the apparatus is therefore 1.5 m/s. The spray solution is introduced into the fluidized bed using a twin-fluid nozzle. The fine spray-droplets of the suspension deposit onto the bed material and dry on its surface. The granules grow. Granules are continuously discharged.

Preparation, Processing, and Testing of Flame-retardant Compounded Materials and of Plastics Moldings The flame retardant components are mixed with the polymer granules and optionally with additives, and incorporated in a twin-screw extruder (Leistritz LSM 30/34) at temperatures of from 230 to 260° C. (PBT), 260° C. (PA6), or from 260 to 280° C. (PA 66). The homogenized polymer strand is drawn off, cooled in a waterbath, and then granulated.

After adequate drying, the molding compositions are processed in an injection-molding machine (Aarburg Allrounder) at melt temperatures of from 240 to 270° C. (PBT), 275° C. (PA 6), or from 260 to 290° C. (PA 66) to give test specimens.

Unless otherwise stated, the % data below are always % by weight. Parts by weight are abbreviated to "PW".

EXAMPLE 1

In accordance with the general instruction for "spray granulation", a dispersion composed of 9.9 PW of aluminum phosphinate, 0.1 PW of polyvinyl alcohol, 2 PW of acetone, and about 88 PW of water was prepared and processed to give a phosphorus-containing flame retardant agglomerate composed of 99% of aluminum phosphinate and 1% of polyvinyl alcohol (table 1).

EXAMPLE 2

In accordance with the general instruction for "spray granulation", a dispersion composed of 24.75 PW of aluminum phosphinate, 0.25 PW of polyvinyl alcohol, 2 PW of isopropanol, and about 73 PW of water was prepared and processed to give a phosphorus-containing flame retardant agglomerate composed of 99% of aluminum phosphinate and 1% of polyvinyl alcohol (table 1).

EXAMPLE 3

In accordance with the general instructions for "spray granulation", a dispersion was prepared from 12.44 PW of aluminum phosphinate, 12.44 PW of urea cyanurate, 0.125 PW of polyvinyl alcohol, 2 PW of surfactant, and about 73 PW of water, and processed to give a phosphorus-containing flame retardant agglomerate composed of 49.75% of aluminum phosphiniate, 49.75% of urea cyanurate, and 0.5% of polyvinyl alcohol (table 1).

EXAMPLE 4

In accordance with the general instruction for "spray granulation", a dispersion composed of 16.6 PW of aluminum phosphinate, 8.2 PW of melamine cyanurate, 0.25 PW of polyvinyl alcohol, 2 PW of isopropanol, and 73 PW of water was prepared and processed to give a phosphorus-containing flame retardant agglomerate composed of 66.3% of aluminum phosphinate, 32.7% of melamine cyanurate and 1% of polyvinyl alcohol (table 1).

EXAMPLE 5

In accordance with the general instruction for "spray granulation", a dispersion composed of 16.6 PW of aluminum phosphinate, 4.0 PW of melamine, 4.1 PW of cyanurate, 0.25 PW of polyvinyl alcohol, 2 PW of isopropanol, and about 73 PW of water was prepared and processed to give a phosphorus-containing flame retardant agglomerate composed of 66.3% of aluminum phosphinate, 32.7% of melamine cyanurate and 1% of polyvinyl alcohol (table 1).

EXAMPLE 6

In accordance with the general instruction for "spray granulation", a dispersion composed of 6.7 PW of aluminum phosphinate, 3.3 PW of melamine polyphosphate, 0.05 PW of polyvinyl alcohol, 1 PW of isopropanol, and 89 PW of water was prepared and processed to give a phosphorus-containing flame retardant agglomerate composed of 66.7% of aluminum phosphinate, 32.8% of melamine cyanurate and 0.5% of polyvinyl alcohol (table 1).

EXAMPLE 7

In accordance with the general instruction for "spray granulation", a dispersion composed of 6.7 PW of aluminum phosphinate, 3.3 PW of melamine polyphosphate, 0.05 PW of polyvinyl alcohol, 5 PW of isopropanol, and about 85 PW of water was prepared and processed to give a phosphorus-containing flame retardant agglomerate composed of 66.7% of aluminum phosphinate, 32.8% of melamine cyanurate and 0.5% of polyvinyl alcohol (table 1).

EXAMPLE 8

In accordance with the general instruction for "spray granulation", a dispersion composed of 6.7 PW of aluminum phosphinate, 3.3 PW of melamine polyphosphate, 0.05 PW of polyvinyl alcohol, 10 PW of isopropanol, and 80 PW of water was prepared and processed to give a phosphorus-containing flame retardant agglomerate composed of 66.7% of aluminum phosphinate, 32.8% of melamine polyphosphate and 0.5% of polyvinyl alcohol (table 1).

EXAMPLE 9

In accordance with the general instruction for "spray granulation", a dispersion composed of 6.7 PW of aluminum phosphinate, 3.3 PW of melamine polyphosphate, 0.05 PW of polyvinyl alcohol, 90.1 PW of isopropanol was prepared and processed to give a phosphorus-containing flame retardant agglomerate composed of 66.7% of aluminum phosphinate, 32.8% of melamine polyphosphate and 0.5% of polyvinyl alcohol (table 1).

EXAMPLE 10

In accordance with the general instruction for "spray granulation", a dispersion composed of 9 PW of aluminum phosphinate, 1 PW of melamine polyphosphate, 0.05 PW of polyvinyl alcohol, 5 PW of isopropanol, and 85 PW of water was prepared and processed to give a phosphorus-containing flame retardant agglomerate composed of 89.6% of aluminum phosphinate, 10% of melamine polyphosphate and 0.5% of polyvinyl alcohol (table 1).

EXAMPLE 11

In accordance with the general instruction for "spray granulation", a dispersion composed of 1 PW of aluminum phosphinate, 8.9 PW of melamine polyphosphate, 0.05 PW of polyvinyl alcohol, 5 PW of isopropanol, and 85 PW of water was prepared and processed to give a phosphorus-containing flame retardant agglomerate composed of 10% of aluminum phosphinate, 89.5% of melamine polyphosphate and 0.5% of polyvinyl alcohol (table 1).

EXAMPLE 12

In accordance with the general instruction for "spray granulation", a dispersion composed of 13.3 PW of aluminum phosphinate, 6.5 PW of melamine polyphosphate, 0.2 PW of polyvinyl alcohol, 5 PW of isopropanol, and 75 PW of water was prepared and processed to give a phosphorus-containing flame retardant agglomerate composed of 66.3% of aluminum phosphinate, 32.7% of melamine polyphosphate and 1% of polyvinyl alcohol (table 1).

EXAMPLE 13

In accordance with the general instruction for "spray granulation", a dispersion composed of 33.2 PW of aluminum phosphinate, 16.3 PW of melamine polyphosphate, 0.5 PW of polyvinyl alcohol, 5 PW of isopropanol, and 45 PW of water was prepared and processed to give a phosphorus-containing flame retardant agglomerate composed of 66.3% of aluminum phosphinate, 32.7% of melamine cyanurate and 1% of polyvinyl alcohol (table 1).

EXAMPLE 14

In accordance with the general instruction for "spray granulation", a dispersion composed of 12.7 PW of aluminum phosphinate, 6.4 PW of melamine polyphosphate, 0.8 PW of activated zinc oxide, 0.1 PW of polyvinyl alcohol, 5 PW of isopropanol, and 75 PW of water was prepared and processed to give a phosphorus-containing flame retardant agglomerate composed of 63.7% of aluminum phosphinate, 31.8% of melamine polyphosphate, 4% of zinc oxide, and 0.5% of polyvinyl alcohol (table 1).

EXAMPLE 15

In accordance with the general instruction for "spray granulation", a dispersion composed of 12.7 PW of aluminum phosphinate, 6.3 PW of melamine polyphosphate, 0.8 PW of activated zinc oxide, 0.2 PW of polyvinyl alcohol, 5 PW of isopropanol, and 75 PW of water was prepared and processed to give a phosphorus-containing flame retardant agglomerate composed of 63.3% of aluminum phosphinate, 31.7% of melamine polyphosphate, 4% of zinc oxide, and 1% of polyvinyl alcohol (table 1).

EXAMPLE 16

In accordance with the general instruction for "spray granulation", a dispersion composed of 12.5 PW of aluminum phosphinate, 6.3 PW of melamine polyphosphate, 0.8 PW of activated zinc oxide, 0.4 PW of polyvinyl alcohol, 5 PW of isopropanol, and 75 PW of water was prepared and processed to give a phosphorus-containing flame retardant agglomerate composed of 62.7% of aluminum phosphinate, 31.4% of melamine polyphosphate, 3.9% of zinc oxide, and 2% of polyvinyl alcohol (table 1).

EXAMPLE 17

In accordance with the general instruction for "spray granulation", a dispersion composed of 11.5 PW of aluminum phosphinate, 5.8 PW of melamine polyphosphate, 0.8 PW of activated zinc oxide, 2 PW of polyvinyl alcohol, 5

PW of isopropanol, and 75 PW of water was prepared and processed to give a phosphorus-containing flame retardant agglomerate composed of 57.6% of aluminum phosphinate, 28.8% of melamine polyphosphate, 3.6% of zinc oxide, and 10% of polyvinyl alcohol (table 1).

EXAMPLE 18

In accordance with the general instruction for "spray granulation", a dispersion composed of 19 PW of aluminum phosphinate, 0.8 PW of melamine polyphosphate, 0.1 PW of activated zinc oxide, 0.1 PW of polyvinyl alcohol, 5 PW of isopropanol, and 75 PW of water was prepared and processed to give a phosphorus-containing flame retardant agglomerate composed of 95% of aluminum phosphinate, 4% of melamine polyphosphate, 0.5% of zinc oxide, and 0.5% of polyvinyl alcohol (table 1).

EXAMPLE 19

In accordance with the general instruction for "spray granulation", a dispersion composed of 0.8 PW of aluminum phosphinate, 19 PW of melamine polyphosphate, 0.1 PW of activated zinc oxide, 0.1 PW of polyvinyl alcohol, 5 PW of isopropanol, and 75 PW of water was prepared and processed to give a phosphorus-containing flame retardant agglomerate composed of 4% of aluminum phosphinate, 95% of melamine polyphosphate, 0.5% of zinc oxide, and 0.5% of polyvinyl alcohol (table 1).

EXAMPLE 20

In accordance with the general instruction for "spray granulation", a dispersion composed of 10 PW of aluminum phosphinate, 5 PW of melamine polyphosphate, 5 PW of activated zinc oxide, 0.1 PW of polyvinyl alcohol, 5 PW of isopropanol, and 75 PW of water was prepared and processed to give a phosphorus-containing flame retardant agglomerate composed of 49.8% of aluminum phosphinate, 24.9% of melamine polyphosphate, 24.9% of zinc oxide, and 0.5% of polyvinyl alcohol (table 1).

EXAMPLE 21

In accordance with the general instruction for "spray granulation", a dispersion composed of 12.7 PW of aluminum phosphinate, 6.4 PW of melamine polyphosphate, 0.8 PW of zinc borate, 0.1 PW of polyvinyl alcohol, 5 PW of isopropanol, and 75 PW of water was prepared and processed to give a phosphorus-containing flame retardant agglomerate composed of 63.7% of aluminum phosphinate, 31.8% of melamine polyphosphate and 4% of zinc borate, and 0.5% of polyvinyl alcohol (table 1).

EXAMPLE 22

In accordance with the general instruction for "spray granulation", a dispersion composed of 13.2 PW of aluminum phosphinate, 6.6 PW of melamine phosphate, 0.2 PW of polyvinylpyrrolidone, 5 PW of isopropanol, and 75 PW of water was prepared and processed to give a phosphorus-containing flame retardant agglomerate composed of 66% of aluminum phosphinate, 33% of melamine polyphosphate and 1% of polyvinylpyrrolidone (table 1).

EXAMPLE 23

In accordance with the general instruction for "spray granulation", a dispersion composed of 13.2 PW of aluminum phosphinate, 6.6 PW of melamine polyphosphate, 0.2 PW of polyvinylpyrrolidone, 5 PW of isopropanol, and 75 PW of water was prepared and processed to give a phosphorus-containing flame retardant agglomerate composed of 66% of aluminum phosphinate, 33% of melamine pyrophosphate and 1% of polyvinylpyrrolidone (table 1).

EXAMPLE 24, COMPARISON

Bulk density and tendency toward dusting are determined on an unagglomerated phosphinate of the prior art (table 2).

EXAMPLE 25, COMPARISON

Bulk density and tendency toward dusting are determined on a melt agglomerate of the prior art (table 2).

EXAMPLE 26, COMPARISON

Bulk density and tendency toward dusting are determined on a melt agglomerate phosphinate of the prior art (table 2).

EXAMPLE 27, COMPARISON

Bulk density and tendency toward dusting are determined on a roll compactate of the prior art (table 2).

EXAMPLE 28, COMPARISON

Bulk density and tendency toward dusting are determined on a roll compactate of the prior art (table 2).

EXAMPLE 29

Bulk density and tendency toward dusting are determined on the inventive agglomerate from example 1 (table 2). The tendency toward dusting achieved is comparably low (in relation to examples 25-28), while the bulk density is low (and the amount of binder is smaller in comparison with examples 25 and 26).

EXAMPLE 30

Bulk density and tendency toward dusting are determined on the inventive agglomerate from example 12 (table 2). The tendency toward dusting achieved is comparably low (in relation to examples 25-28), while the bulk density is low (and the amount of binder is smaller in comparison with examples 25 and 26).

EXAMPLE 31

Bulk density and tendency toward dusting are determined on the inventive agglomerate from example 14 (table 2). The tendency toward dusting achieved is comparably low (in relation to examples 25-28), while the bulk density is low (and the amount of binder is smaller in comparison with examples 25 and 26).

EXAMPLE 32

Bulk density and tendency toward dusting are determined on the inventive agglomerate from example 15 (table 2). The tendency toward dusting achieved is comparably low (in relation to examples 25-28), while the bulk density is low (and the amount of binder is smaller in comparison with examples 25 and 26).

EXAMPLE 33

Bulk density and tendency toward dusting are determined on the inventive agglomerate from example 21 (table 2). The tendency toward dusting achieved is comparably low (in relation to examples 25-28), while the bulk density is low (and the amount of binder is smaller in comparison with examples 25 and 26).

EXAMPLE 34

Following the general instructions, a mixture of 50% by weight of polybutylene terephthalate No. 1, 20% by weight of agglomerate from example 1, and 30% by weight of glass fibers No. 1 is compounded in a twin-screw extruder to give a polymer molding composition. After drying, the molding compositions are processed in an injection-molding machine to give polymer moldings.

EXAMPLE 35

Following the general instructions, a mixture of 49% by weight of polybutylene terephthalate No. 2, 20% by weight of agglomerate from example 4, 1% by weight of carbodiimide, and 30% by weight of glass fibers No. 1 is compounded in a twin-screw extruder to give a polymer molding composition. After drying, the molding compositions are processed in an injection-molding machine to give polymer moldings.

EXAMPLE 36

Following the general instructions, a mixture of 49% by weight of polybutylene terephthalate No. 2, 20% by weight of agglomerate from example 12, and 1% by weight of carbodiimide, and 30% by weight of glass fibers No. 1 is compounded in a twin-screw extruder to give a polymer molding composition. After drying, the molding compositions are processed in an injection-molding machine to give polymer moldings.

EXAMPLE 37

Following the general instructions, a mixture of 50% by weight of nylon-6,6 No. 1, 20% by weight of agglomerate from example 12, and 30% by weight of glass fibers No. 1 is compounded in a twin-screw extruder to give a polymer molding composition. After drying, the molding compositions are processed in an injection-molding machine to give polymer moldings.

EXAMPLE 38

Following the general instructions, a mixture of 50% by weight of nylon-6,6 No. 1, 20% by weight of agglomerate from example 15, and 30% by weight of glass fibers No. 1 is compounded in a twin-screw extruder to give a polymer molding composition. After drying, the molding compositions are processed in an injection-molding machine to give polymer moldings.

EXAMPLE 39

Following the general instructions, a mixture of 50% by weight of nylon-6,6 No. 1, 20% by weight of agglomerate from example 21, and 30% by weight of glass fibers No. 1 is compounded in a twin-screw extruder to give a polymer molding composition. After drying, the molding compositions are processed in an injection-molding machine to give polymer moldings.

EXAMPLE 40

Following the general instructions, a mixture of 50% by weight of nylon-6,6 No. 2, 20% by weight of agglomerate from example 10, and 30% by weight of glass fibers No. 1 is compounded in a twin-screw extruder to give a polymer molding composition. After drying, the molding compositions are processed in an injection-molding machine to give polymer moldings.

EXAMPLE 41

Following the general instructions, a mixture of 50% by weight of nylon-6,6 No. 2, 20% by weight of agglomerate from example 11, and 30% by weight of glass fibers No. 1 is compounded in a twin-screw extruder to give a polymer molding composition. After drying, the molding compositions are processed in an injection-molding machine to give polymer moldings.

EXAMPLE 42

Following the general instructions, a mixture of 50% by weight of nylon-6,6 No. 2, 20% by weight of agglomerate from example 18, and 30% by weight of glass fibers No. 1 is compounded in a twin-screw extruder to give a polymer molding composition. After drying, the molding compositions are processed in an injection-molding machine to give polymer moldings.

EXAMPLE 43

Following the general instructions, a mixture of 50% by weight of nylon-6,6 No. 2, 20% by weight of agglomerate from example 19, and 30% by weight of glass fibers No. 1 is compounded in a twin-screw extruder to give a polymer molding composition. After drying, the molding compositions are processed in an injection-molding machine to give polymer moldings.

EXAMPLE 44

Following the general instructions, a mixture of 50% by weight of nylon-6,6 No. 2, 20% by weight of agglomerate from example 20, and 30% by weight of glass fibers No. 1 is compounded in a twin-screw extruder to give a polymer molding composition. After drying, the molding compositions are processed in an injection-molding machine to give polymer moldings.

EXAMPLE 45

Following the general instructions, a mixture of 50% by weight of nylon-6 No. 1, 20% by weight of agglomerate from example 12, and 30% by weight of glass fibers No. 1 is compounded in a twin-screw extruder to give a polymer molding composition. After drying, the molding compositions are processed in an injection-molding machine to give polymer moldings.

EXAMPLE 46

Following the general instructions, a mixture of 50% by weight of nylon-6 No. 1, 20% by weight of agglomerate from example 15, and 30% by weight of glass fibers No. 1 is compounded in a twin-screw extruder to give a polymer molding composition. After drying, the molding compositions are processed in an injection-molding machine to give polymer moldings.

EXAMPLE 47

Following the general instructions, a mixture of 50% by weight of nylon-6 No. 1, 20% by weight of agglomerate from example 21, and 30% by weight of glass fibers No. 1 is compounded in a twin-screw extruder to give a polymer molding composition. After drying, the molding compositions are processed in an injection-molding machine to give polymer moldings.

EXAMPLE 48

Following the general instructions, a mixture of 50% by weight of nylon-6 No. 2, 20% by weight of agglomerate from example 10, and 30% by weight of glass fibers No. 1 is compounded in a twin-screw extruder to give a polymer molding composition. After drying, the molding compositions are processed in an injection-molding machine to give polymer moldings.

EXAMPLE 49

Following the general instructions, a mixture of 50% by weight of nylon-6 No. 2, 20% by weight of agglomerate from example 11, and 30% by weight of glass fibers No. 1 is compounded in a twin-screw extruder to give a polymer molding composition. After drying, the molding compositions are processed in an injection-molding machine to give polymer moldings.

EXAMPLE 50

Following the general instructions, a mixture of 55% by weight of nylon-12, 20% by weight of agglomerate from example 3, and 30% by weight of glass fibers No. 2 is compounded in a twin-screw extruder to give a polymer molding composition. After drying, the molding compositions are processed in an injection-molding machine to give polymer moldings.

Chemicals Used

| | |
|---|---|
| Aluminum phosphate 1 | Exolit OP 1230, Clariant GmbH |
| Melamine cyanurate | Melapur MC, DSM Melapur |
| Melamine | BASF AG |
| Cyanuric acid | Chemie Linz |
| Melamine polyphosphate | Melapur 200/70, Ciba-DSM Melapur |
| Melamine phosphate | Melapur MP, Ciba-DSM Melapur |
| Melamine pyrophosphate | Budit 311, Budenheim, |
| Activated zinc oxide | Bayer AG |
| Zinc borate | Firebrake ZB, Borax |
| Polyvinyl alcohol | Mowiol 40–88, Clariant GmbH |
| Polyvinylpyrrolidone | Luviskol K30, BASF |
| Acetone | Shell Chemicals |
| Isopropanol | Brenntag |
| Surfactant | Genapol 2822, Clariant |
| Aluminum phosphinate 2 (comp) | Exolit OP 1311, Clariant |
| Polybutylene terephthalate No. 1 | Celanex 2500, Celanese |
| Polybutylene terephthalate No. 2 | Celanex 2002, Celanese |
| Nylon-6,6 No. 1 | Ultramid A3, BASF |
| Nylon-6,6 No. 2 | Durethan A 30, BASF |
| Nylon-6 No. 1 | Zytel 7301, DuPont |
| Nylon-6 No. 2 | Durethan B 29, BASF |
| Nylon-12 | Grillamid L20, Ems Chemie |
| Carbodiimide | Stabaxol KE 9193, Rhein Chemie |
| Glass fibers No. 1 | Vetrotex EC 10 983, 4.5 mm, Saint Gobain |
| Glass fibers No. 2 | Chop Vantage 3540, PPG |

TABLE 1-1

| | | Example | | | | | | | | |
|---|---|---|---|---|---|---|---|---|---|---|
| | | 1 | | 2 | | 3 | | 4 | | 5 | |
| | | S = slurry, A = agglomerate | | | | | | | | | |
| | | S | A | S | A | S | A | S | A | S | A |
| Aluminum phosphinate 1 | [%] | 9.9 | 99 | 24.75 | 99 | 12.44 | 49.75 | 16.6 | 66.3 | 16.6 | 66.3 |
| Urea cyanurate | [%] | — | — | — | — | 12.44 | 49.75 | — | — | — | — |
| Melamine cyanurate | [%] | — | — | — | — | — | — | 8.2 | 32.7 | — | 32.7 |
| Melamine | [%] | — | — | — | — | — | — | — | — | 4.0 | — |
| Cyanuric acid | [%] | — | — | — | — | — | — | — | — | 4.1 | — |
| Melamine polyphosphate | [%] | — | — | — | — | — | — | — | — | — | — |
| Melamine phosphate | [%] | — | — | — | — | — | — | — | — | — | — |
| Melamine pyrophosphate | [%] | — | — | — | — | — | — | — | — | — | — |
| Activated zinc oxide | [%] | — | — | — | — | — | — | — | — | — | — |
| Zinc borate | [%] | — | — | — | — | — | — | — | — | — | — |
| Polyvinyl alcohol | [%] | 0.1 | 1 | 0.25 | 1 | 0.125 | 0.5 | 0.25 | 1 | 0.25 | 1 |
| Polyvinylpyrrolidone | [%] | — | — | — | — | — | — | — | — | — | — |
| Acetone | [%] | 2 | — | — | — | — | — | — | — | — | — |
| Isopropanol | [%] | — | — | 2 | — | — | — | 2 | — | 2 | — |
| Surfactant | [%] | — | — | — | — | 2 | — | — | — | — | — |
| Water | [%] | about 88 | — | about 73 | — | about 73 | — | about 73 | — | about 73 | — |

TABLE 1-2

| | | Example | | | | | | | |
|---|---|---|---|---|---|---|---|---|---|
| | | 6 | | 7 | | 8 | | 9 | |
| | | S = slurry, A = agglomerate | | | | | | | |
| | — | S | A | S | A | S | A | S | A |
| Aluminum phosphinate 1 | [%] | 6.7 | 66.7 | 6.7 | 66.7 | 6.7 | 66.7 | 6.7 | 66.7 |
| Urea cyanurate | [%] | — | — | — | — | — | — | — | — |
| Melamine cyanurate | [%] | — | — | — | — | — | — | — | — |
| Melamine | [%] | — | — | — | — | — | — | — | — |
| Cyanuric acid | [%] | — | — | — | — | — | — | — | — |
| Melamine polyphosphate | [%] | 3.3 | 32.8 | 3.3 | 32.8 | 3.3 | 32.8 | 3.3 | 32.8 |
| Melamine phosphate | [%] | — | — | — | — | — | — | — | — |
| Melamine pyrophoshate | [%] | — | — | — | — | — | — | — | — |
| Activated zinc oxide | [%] | — | — | — | — | — | — | — | — |
| Zinc borate | [%] | — | — | — | — | — | — | — | — |
| Polyvinyl alcohol | [%] | 0.05 | 0.5 | 0.05 | 0.5 | 0.05 | 0.5 | 0.05 | 0.5 |
| Polyvinylpyrrolidone | [%] | — | — | — | — | — | — | — | — |
| Acetone | [%] | — | — | — | — | — | — | — | — |
| Isopropanol | [%] | 1 | — | 5 | — | 10 | — | 90 | — |
| Surfactant | [%] | — | — | — | — | — | — | — | — |
| Water | [%] | about 89 | — | about 85 | — | about 80 | — | about 0 | — |

TABLE 1-3

| | | Example | | | | | | | |
|---|---|---|---|---|---|---|---|---|---|
| | | 10 | | 11 | | 12 | | 13 | |
| | | S = slurry, A = agglomerate | | | | | | | |
| | — | S | A | S | A | S | A | S | A |
| Aluminum phosphinate 1 | [%] | 8.9 | 89.5 | 1.0 | 10.0 | 13.3 | 66.3 | 33.2 | 66.3 |
| Urea cyanurate | [%] | — | — | — | — | — | — | — | — |
| Melamine cyanurate | [%] | — | — | — | — | — | — | — | — |
| Melamine | [%] | — | — | — | — | — | — | — | — |
| Cyanuric acid | [%] | — | — | — | — | — | — | — | — |
| Melamine polyphosphate | [%] | 1.0 | 10.0 | 8.9 | 89.5 | 6.5 | 32.7 | 16.3 | 32.7 |
| Melamine phosphate | [%] | — | — | — | — | — | — | — | — |
| Melamine pyrophoshate | [%] | — | — | — | — | — | — | — | — |
| Activated zinc oxide | [%] | — | — | — | — | — | — | — | — |
| Zinc borate | [%] | — | — | — | — | — | — | — | — |
| Polyvinyl alcohol | [%] | 0.05 | 0.5 | 0.05 | 0.5 | 0.2 | 1 | 0.5 | 1 |
| Polyvinylpyrrolidone | [%] | — | — | — | — | — | — | — | — |
| Acetone | [%] | — | — | — | — | — | — | — | — |
| Isopropanol | [%] | 5 | — | 5 | — | 5 | — | 5 | — |
| Surfactant | [%] | — | — | — | — | — | — | — | — |
| Water | [%] | about 85 | — | about 85 | — | about 75 | — | about 45 | — |

TABLE 1-4

| | | Example | | | | | | | |
|---|---|---|---|---|---|---|---|---|---|
| | | 14 | | 15 | | 16 | | 17 | |
| | | S = slurry, A = agglomerate | | | | | | | |
| | — | S | A | S | A | S | A | S | A |
| Aluminum phosphinate 1 | [%] | 12.7 | 63.7 | 12.7 | 63.3 | 12.5 | 62.7 | 11.5 | 57.6 |
| Urea cyanurate | [%] | — | — | — | — | — | — | — | — |
| Melamine cyanurate | [%] | — | — | — | — | — | — | — | — |
| Melamine | [%] | — | — | — | — | — | — | — | — |
| Cyanuric acid | [%] | — | — | — | — | — | — | — | — |
| Melamine polyphosphate | [%] | 6.4 | 31.8 | 6.3 | 31.7 | 6.3 | 31.4 | 5.8 | 28.8 |
| Melamine phosphate | [%] | — | — | — | — | — | — | — | — |
| Melamine pyrophoshate | [%] | — | — | — | — | — | — | — | — |
| Activated zinc oxide | [%] | 0.8 | 4.0 | 0.8 | 4 | 0.8 | 3.9 | 0.7 | 3.6 |
| Zinc borate | [%] | — | — | — | — | — | — | — | — |
| Polyvinyl alcohol | [%] | 0.1 | 0.5 | 0.2 | 1 | 0.4 | 2 | 2 | 10 |
| Polyvinylpyrrolidone | [%] | — | — | — | — | — | — | — | — |
| Acetone | [%] | — | — | — | — | — | — | — | — |

TABLE 1-4-continued

|  |  | Example | | | | | | | |
|---|---|---|---|---|---|---|---|---|---|
|  |  | 14 | | 15 | | 16 | | 17 | |
|  |  | \multicolumn{8}{c}{S = slurry, A = agglomerate} | | | | | | | |
|  | — | S | A | S | A | S | A | S | A |
| Isopropanol | [%] | 5 | — | 5 | — | 5 | — | 5 | — |
| Surfactant | [%] | — | — | — | — | — | — | — | — |
| Water | [%] | about 75 | — | about 75 | — | about 75 | — | about 75 | — |

TABLE 1-5

|  |  | Example | | | | | | | | | | | |
|---|---|---|---|---|---|---|---|---|---|---|---|---|---|
|  |  | 18 | | 19 | | 20 | | 21 | | 22 | | 23 | |
|  |  | \multicolumn{12}{c}{S = slurry, A = agglomerate} | | | | | | | | | | | |
|  | — | S | A | S | A | S | A | S | A | S | A | S | A |
| Aluminum phosphinate 1 | [%] | 19.0 | 95 | 0.8 | 4.0 | 10.0 | 49.8 | 12.7 | 63.7 | 13.2 | 66 | 13.2 | 66 |
| Urea cyanurate | [%] | — | — | — | — | — | — | — | — | — | — | — | — |
| Melamine cyanurate | [%] | — | — | — | — | — | — | — | — | — | — | — | — |
| Melamine | [%] | — | — | — | — | — | — | — | — | — | — | — | — |
| Cyanuric acid | [%] | — | — | — | — | — | — | — | — | — | — | — | — |
| Melamine polyphosphate | [%] | 0.8 | 4.0 | 19.0 | 95 | 5.0 | 24.9 | 6.4 | 31.8 | — | — | — | — |
| Melamine phosphate | [%] | — | — | — | — | — | — | — | — | 6.6 | 33 | — | — |
| Melamine pyrophoshate | [%] | — | — | — | — | — | — | — | — | — | — | 6.6 | 33 |
| Activated zinc oxide | [%] | 0.1 | 0.5 | 0.1 | 0.5 | 5.0 | 24.9 | — | — | — | — | — | — |
| Zinc borate | [%] | — | — | — | — | — | — | 0.8 | 4.0 | — | — | — | — |
| Polyvinyl alcohol | [%] | 0.1 | 0.5 | 0.1 | 0.5 | 0.1 | 0.5 | 0.1 | 0.5 | — | — | — | — |
| Polyvinylpyrrolidone | [%] | — | — | — | — | — | — | — | — | 0.2 | 1 | 0.2 | 1 |
| Acetone | [%] | — | — | — | — | — | — | — | — | — | — | — | — |
| Isopropanol | [%] | 5 | — | 5 | — | 5 | — | 5 | — | 5 | — | 5 | — |
| Surfactant | [%] | — | — | — | — | — | — | — | — | — | — | — | — |
| Water | [%] | about 75 | — | about 75 | — | about 75 | — | about 75 | — | about 75 | — | about 75 | — |

TABLE 2

| Example | — |  | Bulk density [g/L] | Dusting tendency [%] | Grain size fraction [µm] | Comments |
|---|---|---|---|---|---|---|
| 24 | Aluminum phosphinate 2 (comp) | [%] | 399 | 24.2 | — | — |
| 25 | Melt granules of 2002DE131 (comp) | [%] | 305 | 4 | 400–1400 | 2% Binder (Licowax) |
| 26 | Melt granules of 2002DE131 (comp) | [%] | 857 | 7 | 400–1400 | 15% Binder (Licowax) |
| 27 | Compacted phosphinate of 2002DE132 (comp) | [%] | 389 | 2 | 400–1000 | 100% POF |
| 28 | Compacted phosphinate of 2002DE132 (comp) | [%] | 817 | 7 | 400–1000 | 100% POF |
| 29 | Agglomerate of example 1 | [%] | 302.5 | 8.8 | 500–800 | — |
| 30 | Agglomerate of example 12 | [%] | 273 | 10.1 | 500–800 | — |
| 31 | Agglomerate of example 14 | [%] | 279 | 3 | 200–500 | — |
| 32 | Agglomerate of example 15 | [%] | 296.5 | 3.4 | 500–1000 | — |
| 33 | Agglomerate of example 21 | [%] | 256 | 5.2 | 500–800 | — |

OPF = organophosphorus flame retardant

TABEL 3

|  |  | Example | | | | | | | | | | | | | | | | |
|---|---|---|---|---|---|---|---|---|---|---|---|---|---|---|---|---|---|
|  | — | 34 | 35 | 36 | 37 | 38 | 39 | 40 | 41 | 42 | 43 | 44 | 45 | 46 | 47 | 48 | 49 | 50 |
| Polybutylene terephthalate No. 1 | [%] | 50 | — | — | — | — | — | — | — | — | — | — | — | — | — | — | — | — |
| Polybutylene terephthalate No. 2 | [%] | — | 49 | 49 | — | — | — | — | — | — | — | — | — | — | — | — | — | — |
| Nylon-6,6 No. 1 | [%] | — | — | — | 50 | 50 | 50 | — | — | — | — | — | — | — | — | — | — | — |
| Nylon-6,6 No. 2 | [%] | — | — | — | — | — | — | 50 | 50 | 50 | 50 | 50 | — | — | — | — | — | — |
| Nylon-6 No. 1 | [%] | — | — | — | — | — | — | — | — | — | — | — | 50 | 50 | 50 | — | — | — |
| Nylon-6 No. 2 | [%] | — | — | — | — | — | — | — | — | — | — | — | — | — | — | 50 | 50 | — |
| Nylon-12 | [%] | — | — | — | — | — | — | — | — | — | — | — | — | — | — | — | — | 55 |
| Agglomerate of example 1 | [%] | 20 | — | — | — | — | — | — | — | — | — | — | — | — | — | — | — | — |
| Agglomerate of example 4 | [%] | — | 20 | — | — | — | — | — | — | — | — | — | — | — | — | — | — | — |

TABEL 3-continued

| | | \multicolumn{17}{c}{Example} |
|---|---|---|---|---|---|---|---|---|---|---|---|---|---|---|---|---|---|
| | — | 34 | 35 | 36 | 37 | 38 | 39 | 40 | 41 | 42 | 43 | 44 | 45 | 46 | 47 | 48 | 49 | 50 |
| Agglomerate of example 12 | [%] | — | — | 20 | 20 | — | — | — | — | — | — | — | 20 | — | — | — | — | — |
| Agglomerate of example 15 | [%] | — | — | — | — | 20 | — | — | — | — | — | — | — | 20 | — | — | — | — |
| Agglomerate of example 21 | [%] | — | — | — | — | — | 20 | — | — | — | — | — | — | — | 20 | — | — | — |
| Agglomerate of example 10 | [%] | — | — | — | — | — | — | 20 | — | — | — | — | — | — | — | 20 | — | — |
| Agglomerate of example 11 | [%] | — | — | — | — | — | — | — | 20 | — | — | — | — | — | — | — | 20 | — |
| Agglomerate of example 18 | [%] | — | — | — | — | — | — | — | — | 20 | — | — | — | — | — | — | — | — |
| Agglomerate of example 19 | [%] | — | — | — | — | — | — | — | — | — | 20 | — | — | — | — | — | — | — |
| Agglomerate of example 20 | [%] | — | — | — | — | — | — | — | — | — | — | 20 | — | — | — | — | — | — |
| Agglomerate of example 3 | [%] | — | — | — | — | — | — | — | — | — | — | — | — | — | — | — | — | 20 |
| Carbodiimide | [%] | — | 1 | 1 | — | — | — | — | — | — | — | — | — | — | — | — | — | — |
| Glass fibers No. 1 | [%] | 30 | 30 | 30 | 30 | 30 | 30 | 30 | 30 | 30 | 30 | 30 | 30 | 30 | 30 | 30 | 30 | — |
| Glass fibers No. 2 | [%] | — | — | — | — | — | — | — | — | — | — | — | — | — | — | — | — | 25 |

The invention claimed is:

1. A phosphorus-containing flame retardant agglomerate, comprising
   a) from 99.99 to 80% by weight of aggregates and/or primary particles comprising at least one phosphinic compound selected from the group consisting of a phosphinic salt of the formula (I), a diphosphinic salt of the formula (II), a polymer of the phosphinic salt, a polymer of the diphosphinic salt and mixtures thereof,

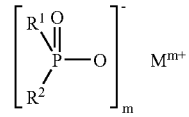
(I)

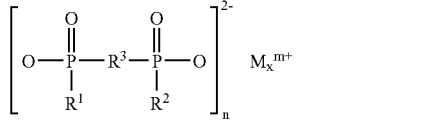
(II)

where
   $R^1, R^2$ are identical or different and are $C_1$-$C_6$-alkyl, linear or branched, or aryl;
   $R^3$ is $C_1$-$C_{10}$-alkylene, linear or branched, $C_6$-$C_{10}$-arylene, -alkylarylene or -arylalkylene;
   M is Mg, Ca, Al, Sb, Sn, Ge, Ti, Fe, Zr, Ce, Bi, Sr, Mn, Li, Na, K or a protonated nitrogen base;
   m is from 1 to 4; n is from 1 to 4; x is from 1 to 4 and
   b) from 0.01 to 20% by weight of aggregates and/or primary particles of at least one auxiliary, wherein the at least one auxiliary is a polymer or copolymer based on vinylpyrrolidone, vinyl acetate, or vinylcaprolactam, epoxides, urethanes, acrylates, esters, amides, stearates, olefins, cellulose derivatives, or a mixture thereof.

2. The phosphorus-containing flame retardant agglomerates as claimed in claim 1, wherein the aggregates and/or primary particles further comprises at least one synergist.

3. The phosphorus-containing flame retardant agglomerate as claimed in claim 2, wherein component a) comprises from 30 to 99.9% by weight of the at least one phosphinic compound, and
   from 0.1 to 70% by weight of the at least one synergist.

4. The phosphorus-containing flame retardant agglomerate as claimed in claim 2, wherein component a) comprises from 50 to 99% by weight of a zinc, aluminum, titanium, zirconium or iron salt of the phosphinic acid of the formula (I), of the diphosphinic acid of the formula (II), polymers thereof and mixtures thereof, and
   from 1 to 50% by weight of the at least one synergist selected from the group consisting of the salts of phosphoric acid and their condensates, salts of cyanuric acid with melamine and its condensates and hydrolysis products thereof.

5. The phosphorus-containing flame retardant agglomerate as claimed in claim 4, wherein the at least one synergist is a zinc compound.

6. The phosphorus-containing flame retardant agglomerate as claimed in claim 2, wherein the at least one synergist is selected from the group consisting of nitrogen compounds, phosphorus compounds, and phosphorus and nitrogen compounds.

7. The phosphorus-containing flame retardant agglomerate as claimed in claim 2, wherein the at least one synergist is nitrogen compound of the formulae (III) to (VIII), or a mixture thereof

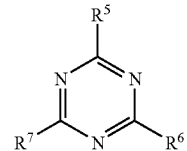
(III)

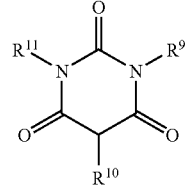
(IV)

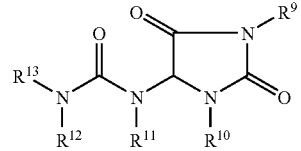
(V)

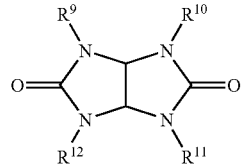
(VI)

-continued

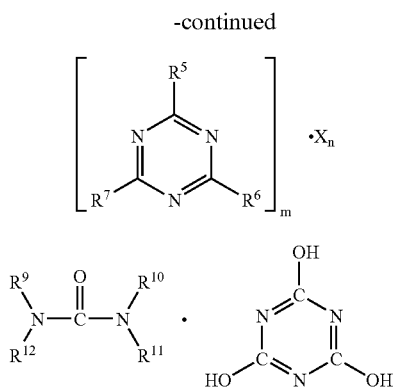

where
- $R^5$ to $R^7$ are hydrogen, $C_1$-$C_8$-alkyl, $C_5$-$C_{16}$-cycloalkyl or -alkylcycloalkyl, and where appropriate, substituted with a hydroxy function or with a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$, and
- —$N(R^8)R^9$, either N-alicyclic or N-aromatic,
- $R^8$ is hydrogen, $C_1$-$C_8$-alkyl, $C_5$-$C_{16}$-cycloalkyl or -alkylcycloalkyl, and where appropriate, substituted with a hydroxy function or with a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl,
- $R^9$ to $R^{13}$ are groups identical with $R^8$ or —O—$R^8$,
- m and n, independently of one another, are 1, 2, 3, or 4, and
- X is an acid acids which forms adducts with triazine compounds (III).

8. The phosphorus-containing flame retardant agglomerate as claimed in claim 2, wherein the at least one synergist is a synthetic inorganic compound or a mineral product.

9. The phosphorus-containing flame retardant agglomerate as claimed in claim 8, wherein the at least one synergist is selected from the group consisting of oxygen compounds of silicon, magnesium compounds, metal carbonates of metals of the second main group of the Periodic Table, red phosphorus, compounds of zinc or of aluminum, and antimony.

10. The phosphorus-containing flame retardant agglomerate as claimed in claim 5, wherein the zinc compound is selected from the group consisting of -zinc oxide, zinc hydroxide, zinc oxide hydrate, anhydrous zinc carbonate, basic zinc carbonate, zinc hydroxide carbonate, basic zinc carbonate hydrate, basic zinc silicate, zinc hexafluorosilicate, zinc stannate, zinc magnesium aluminum hydroxide carbonate, zinc hexafluorosilicate hexahydrate, zinc salts of the oxo acids of the third main group, zinc salts of the oxo acids of the fifth main group, zinc salts of the oxo acids of the transition metals, zinc chromite, zinc molybdate, zinc permanganate, and zinc molybdate magnesium silicate.

11. The phosphorus-containing flame retardant agglomerate as claimed in claim 1, wherein the melting or softening point of the at least one auxiliary is from 40 to 350° C.

12. The phosphorus-containing flame retardant agglomerate as claimed in claim 1, wherein the at least one auxiliary is selected from the group consisting of polyvinyl alcohol, polyvinyl butyral (PVB), polyvinylcaprolactam, hydroxyethylcellulose, hydroxypropylcellulose, and sodium carboxymethylcellulose.

13. The phosphorus-containing flame retardant agglomerate as claimed in claim 1, whose median particle size is from 0.1 to 3000 µm.

14. A process for preparing a phosphorus-containing flame retardant agglomerate as claimed in claim 1, comprising the step of agglomerating the aggregates and/or primary particles of the at least one phosphinic compound in the presence of the aggregates and/or primary particles of the at least one auxiliary in a mixer, or a fluidized bed, or via spray drying.

15. The process as claimed in claim 14, wherein the agglomerating step further comprises mixing the aggregates and/or primary particles of the at least one phosphinic compound, the aggregates and/or primary particles of the at least one auxiliary, in a solvent to form a mixture, feeding the mixture to a fluidized bed, drying the mixture, granulating the mixture to form the agglomerates, isolating the agglomerates and separating the agglomerates having a predetermined grain size.

16. The process as claimed in claim 14, wherein the agglomerating step further comprises feeding the aggregates and/or primary particles of the at least one phosphinic compound, the aggregates and/or primary particles of the at least one auxiliary into a fluidized bed, metering in a solvent to the fluidized bed to form a mixture, granulating the mixture to form the agglomerates, isolating the agglomerates, and separating the agglomerates having a predetermined grain size.

17. The process as claimed in claim 15, wherein the agglomerating step further comprises returning agglomerates having a grain size greater than or less than the predetermined grain size for further processing.

18. The process as claimed in claim 14, wherein the solvent is selected from the group consisting of water, alcohols, glycols, aromatics, aliphatics, cycloaliphatics, ethers, glycol ethers, ketones, esters, chlorinated hydrocarbons and aromatics, and mixtures thereof.

19. The process as claimed in claim 14, wherein the agglomerating step occurs in one or more stages at a pressure of from 10 to 100 000 000 Pa, for a period of from 0.01 to 1000 h, and at a temperature of from −20 to +500° C.

20. A flame-retardant polymer molding composition, comprising
- from 1 to 50% by weight of phosphorus-containing flame retardant agglomerates as claimed in claim 1,
- from 1 to 99% by weight of thermoplastic polymer or a mixture thereof,
- from 0 to 60% by weight of additives, and
- from 0 to 60% by weight of filler.

21. The flame-retardant polymer molding composition as claimed in claim 20, wherein the thermoplastic polymer is selected from the group consisting HI (high-impact) polystyrene, polyphenylene ether, polyamides, polyesters, polycarbonates, and blends or polyblends of the type represented by ABS (acrylonitrile-butadiene-styrene) and PC/ABS (polycarbonate/acrylonitrile-butadiene-styrene).

22. A polymeric article comprising phosphorus-containing flame retardant agglomerates as claimed in claim 1.

23. A flame-retardant coating comprising
- from 1 to 50% by weight of phosphorus-containing flame retardant agglomerates as claimed in claim 1,
- from 0 to 60% by weight of ammonium polyphosphate, and
- from 0 to 60% by weight of additives and auxilaries.

24. The phosphorus-containing flame retardant agglomerate as claimed in claim 1, wherein the melting or softening point of the at least one auxiliary is from 60 to 300° C.

25. The phosphorus-containing flame retardant agglomerate as claimed in claim 1, wherein the median particle size is from 100 to 3000 µm.

26. The phosphorus-containing flame retardant agglomerate as claimed in claim 1, wherein the median particle size is from 200 to 2000 µm.

27. The phosphorus-containing flame retardant agglomerate as claimed in claim 1, having a bulk density of from 80 to 800 g/l.

28. The phosphorus-containing flame retardant agglomerate as claimed in claim 1, having a bulk density of from 200 to 500 g/l.

29. The phosphorus-containing flame retardant agglomerate as claimed in claim 1, having a bulk density of from 200 to 400 g/l.

30. The phosphorus-containing flame retardant agglomerate as claimed in claim 1, wherein the median particle diameter of the aggregates of the at least one phosphinic compound or the at least one synergist is from 0.1 to 500 µm.

31. The phosphorus-containing flame retardant agglomerate as claimed in claim 1, wherein the median particle diameter of the aggregates of the at least one phosphinic compound or the at least one synergist is from 1 to 100 µm.

32. The phosphorus-containing flame retardant agglomerate as claimed in claim 1, wherein the median particle diameter of the primary particles of the at least one phosphinic compound or the at least one synergist is from 0.1 to 50 µm.

33. The phosphorus-containing flame retardant agglomerate as claimed in claim 1, wherein the median particle diameter of the primary particles of the at least one phosphinic compound or the at least one synergist is from 1 to 10 µm.

34. The process as claimed in claim 16, wherein the agglomerating step further comprises returning agglomerates having a grain size greater than or less than the predetermined grain size for further processing.

35. The process as claimed in claim 14, wherein the temperature is from 50 to 350° C.

36. The polymeric article as claimed in claim 22, wherein the polymeric article is a polymeric molding, film or fiber.

37. An article coated with the flame retardant coating as claimed in claim 23.

38. A process for preparing a phosphorus-containing flame retardant agglomerate as claimed in claim 2, comprising the step of agglomerating the aggregates and/or primary particles of the at least one phosphinic compound and the at least one synergist in the presence of the aggregates and/or primary particles of the at least one auxiliary in a mixer, or a fluidized bed, or via spray drying.

* * * * *